July 16, 1929.                K. SOHLER                1,720,974
APPARATUS FOR HEATING MATERIALS
Filed Oct. 18, 1926
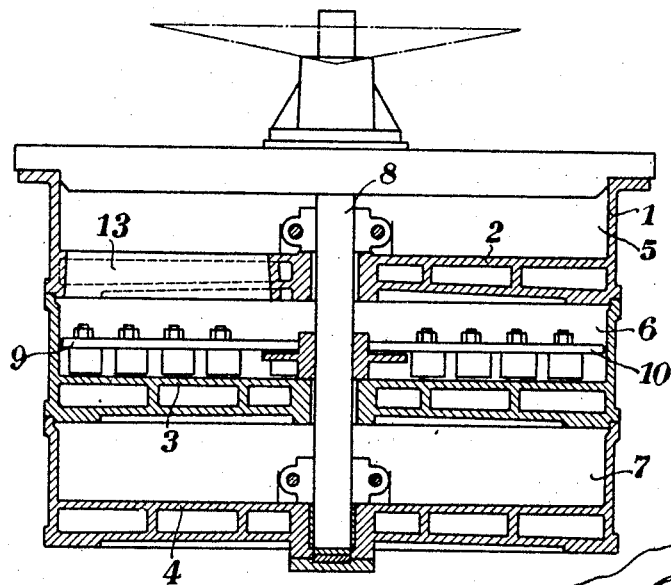
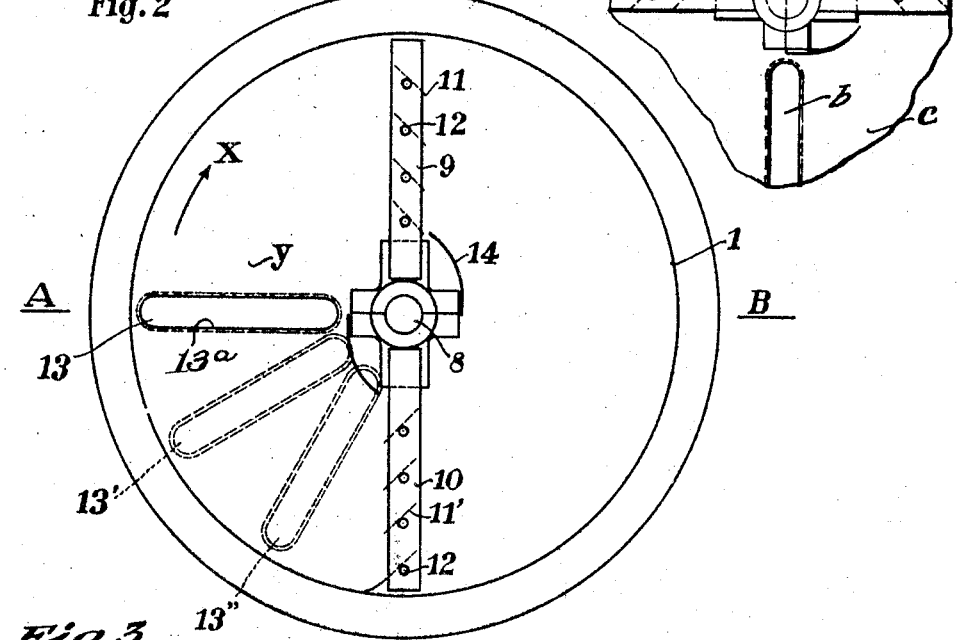
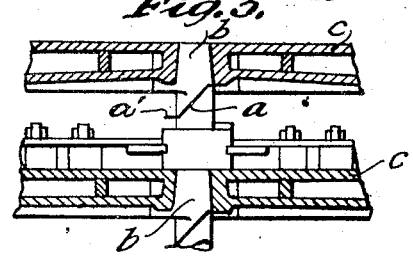
Inventor
Karl Sohler
by Knight Bros
attys.

Patented July 16, 1929.

1,720,974

UNITED STATES PATENT OFFICE.

KARL SOHLER, OF BIEDERITZ, NEAR MAGDEBURG, GERMANY, ASSIGNOR TO FRIED. KRUPP GRUSONWERK AKTIENGESELLSCHAFT, OF MAGDEBURG-BUCKAU, GERMANY.

APPARATUS FOR HEATING MATERIALS.

Application filed October 18, 1926, Serial No. 142,506, and in Germany October 17, 1925.

This invention relates to an apparatus for the heating of oleaginous materials to be pressed, such as for instance oleaginous fruits which after the heating are to be introduced into a press. Hitherto the heating was usually effected in heated warming pans, that is to say in warming pans provided with heaters and filled with the material. The well known arrangements of this kind have the drawback of only permitting of an intermittent working and of the impossibility of ensuring a uniform heating of the material.

The object of the present invention is to render possible the heating of the material in a continuous manner and to ensure a practically uniform heating through of the material. For this purpose in the apparatus according to the present invention the material which is continuously introduced into the warming pan is also conveyed in a continuous manner in a thin layer, for instance 5 centimetres deep, over several heated floors arranged above each other at a small distance apart. The point of delivery of the material and the point of discharge of the material onto the separate floors are preferably displaced relatively to each other in the direction of the conveyance of the material in such manner that the material is conveyed once over the whole floor area from the delivery to the discharge point. Owing to the small distance between the floors, the material is heated in an efficacious manner both from below and from above, so that owing to this, as well as to the small depth of the layer, a uniform heating of the material is obtained in a reliable manner. It is preferred to use a warming pan of circular cross-section, and to provide it with a vertical spindle which passes through all the floors. Above each floor there are mounted on the spindle one or more arms to which are secured the tools conveying the material, such as for instance scrapers, so that the material makes a circular movement on each floor. If two or more arms fitted with scrapers are arranged above each floor, the scrapers could be mounted on the arms in a rotatable manner and so as to be adjustable at different angles to the direction of conveying. In this way it is possible to ensure that the material remains for a longer time on the separate floors, as it will be moved not in a simple circle but in a zigzag line. But even when the material is moved in this manner it will still pass through the heating apparatus in a continuous manner.

In order that the said invention may be clearly understood and readily carried into effect, the same will now be more fully described by way of example with reference to the accompanying drawings, in which:—

Figure 1 shows one form of the heating apparatus in central vertical section and Figure 2 in plan.

Figs. 3 and 4 are fragmentary elevation and plan views respectively of a modified form of apparatus.

The heating pan 1 is provided with three superposed floors 2, 3, 4 arranged at a small distance from each other and made hollow for the purpose of introducing the heating medium. By means of these three floors there are formed in the heating pan 1 three heating chambers 5, 6, 7. In the centre of the heating pan is mounted a vertical spindle 8 passing through all the floors and driven at its upper end. In each of the chambers 5, 6, 7 there are mounted on the spindle 8 in a non-rotatable manner arms 9, 10, on which scrapers 11 are mounted so as to be rotatable about a vertical axis 12. As will be seen from the drawing, the scrapers can be adjusted at different angles to the direction of rotation $x$ of the arms 9, 10. Locking devices may be provided by means of which the scrapers can be set in different angular positions relatively to the direction of rotation of the arms 9, 10. Each of the floors 2, 3, 4 is provided with an elongated, radially extending, discharge aperture 13, 13', 13''. In the construction illustrated in Figs. 1 and 2, the discharge apertures of the floors are staggered or displaced relatively to each other in the direction of rotation $x$ of the stirring and conveying device in such manner that the material dropping from an upper chamber into the chamber below has to traverse almost a complete circular path about the central axis of the warming pan 1 before it can pass on each floor from the point of delivery to the point of discharge. The material to be heated is introduced into the uppermost chamber 5 of the warming pan onto the uppermost floor 2 at the point $y$ and carried by the scrapers 11 in a circle on the floor 2 to the discharge edge 13$^a$ of aperture 13. Through this outlet it drops onto the floor 3 of the chamber 6, is carried in the latter again in a circle to the outlet 13′ and during this time is heated both from the top and from the bottom. It drops then through the outlet 13′ on to the floor 4 of the chamber 7 and is carried on the said floor to the outlet 13″ and from the latter to the press. Owing to the small depth of the layer, the material on its path in the chambers 6, 7 is heated both by the lower and the upper floor, this heating being assisted by the conveying devices 9, 10, 11 which turns over and stirs the material. In this way there is obtained a uniform heating of the material, in spite of the fact that the material remains in each chamber only for a relatively short time. The advantages of the apparatus according to the present invention are therefore continuous, greatly simplified working, uniform heating of the material, and great output of the apparatus as regards the quantity of material passing through it per unit of time.

As shown in Figure 2, the angular position of the scrapers 11 of the stirring arm 9 is different from that of the scrapers 11′ of the arm 10. As regards the setting of the scrapers, the following may be remarked. If the scrapers are adjusted in such manner that their working surface extends radially, that is to say parallel to the arms 9, 10 they will move the material purely in a circle. If they are adjusted obliquely in the manner indicated in Figure 2 for the scrapers 11 secured to the arms 9, they will press the material gradually towards the wall of the warming pan. If the scrapers are adjusted in the manner shown in Fig. 2 for the scrapers 11′ secured to the arm 10, the material will be gradually forced towards the centre of the warming pan. In both cases, the material will be driven by the scrapers of each arm in the direction of its rotation, but will then gradually rise through the gaps between the scrapers and remain behind the arm in order to be pushed on again by the next arm. It is therefore advisable to set the scrapers on the arms 9, 10 in different positions as shown in Figure 2, for instance so that the material shall be pressed by the scrapers 11 outwards and by the scrapers 11′ inwards. The material will not travel then simply in a circle, but will follow a zigzag line on the floor of the chamber. Owing to the longer path and to the step by step conveying, it will also remain for a longer time in the chamber. By changing the oblique position of the scrapers, the speed of conveying of the material on each floor can then be modified, and therefore the length of stay of the material in the separate chambers can be regulated to suit the nature of the material and the desired degree of heating.

Further there may be mounted on the spindle guide plates 14 which prevent the material from accumulating in the centre of the chambers by moving the material towards the scrapers 11.

Apart from the particular features forming the subject of the present invention the construction of the heating apparatus and the design of the stirring device can of course be different from that previously described. For instance when it is desired to arrange the outlets in the floors not in a staggered manner, but directly under each other, it is possible to arrange under the outlet of the upper floors 2, 3, chutes which deliver the material behind the points of discharge in the direction of rotation of the conveying device, so that in this case also the material will be forced first to traverse its circular path on each floor before being discharged to the floor next below.

Figs. 3 and 4 show such an arrangement. The openings $b$ in the floors $c$ are arranged in vertical alinement and chutes $a$ are secured to the bottoms of the floors below the openings $b$ in such a manner as to deflect the material to a point beyond the opening below in the direction of conveyance of the material.

It will be seen that in each of the two forms of the invention illustrated the discharging edge $13^a$ or $a'$ of the passway through which the material passes from one floor to the next is located beyond the passway of the floor below, in the direction of conveyance of the material, so that the material is forced to travel almost the whole way around each floor before it drops to the floor below, or from the bottom floor out of the kettle. The term "passway" is used to designate the opening 13, 13′, 13″ in Figs. 1 and 2 and in Figs. 3 and 4 the guideway defined by the opening $b$ and the chute $a$.

Claims:

1. Apparatus for heating oil bearing material consisting of a heating kettle having a plurality of superposed spaced floors, a vertical rotatable shaft extending through said floors, radial arms on said shaft above each floor, scrapers on said arms for stirring and advancing the material in a circular direction, said scrapers being adjustable on vertical axes, whereby they may be set at different angles relative to the direction of conveyance of the material, and apertures in said floors through which the material is discharged to the floor below.

2. Apparatus for heating oil bearing material consisting of a heating kettle having a plurality of superposed spaced floors, a vertical rotatable shaft extending through said floors, radial arms on said shaft above each floor, scrapers on said arms adapted to stir the material and advance the material in a circular direction, and a continuously open radially elongated aperture in each floor extending substantially from the center to the periphery of the floor, said apertures being substantially in vertical alinement, and a chute arranged below each aperture adapted to convey the material discharged thereupon to the far side of the aperture in the floor below, in the direction of conveyance of the material.

3. Apparatus for heating oil bearing material consisting of a heating kettle having a plurality of superposed spaced floors, a vertical rotatable shaft extending through said floors, radial arms on said shaft above each floor, scrapers on said arms adapted to stir the material and advance the material in a substantially circular direction, each floor having a passway extending substantially from the center to the periphery of the floor for discharging the material to the floor below, and from the bottom floor out of the kettle, the discharging edge of each passway, except that of the bottom floor, being located just beyond the passway of the floor below, in the direction of circulation of the material.

The foregoing specification signed at Berlin, Germany, this 27th day of September, 1926.

KARL SOHLER.